US008626434B1

(12) United States Patent
Kornmann et al.

(10) Patent No.: US 8,626,434 B1
(45) Date of Patent: Jan. 7, 2014

(54) AUTOMATIC ADJUSTMENT OF A CAMERA VIEW FOR A THREE-DIMENSIONAL NAVIGATION SYSTEM

(75) Inventors: David Kornmann, Tucson, AZ (US); Peter Birch, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/410,217

(22) Filed: Mar. 1, 2012

(51) Int. Cl.
*G01C 21/16* (2006.01)

(52) U.S. Cl.
USPC ............ 701/400; 701/412; 345/625

(58) Field of Classification Search
USPC .................. 345/625; 701/412, 400
See application file for complete search history.

(56) References Cited

U.S. PATENT DOCUMENTS

| | | | |
|---|---|---|---|
| 5,276,785 A * | 1/1994 | Mackinlay et al. ........... 345/427 |
| 6,017,003 A | 1/2000 | Mullins | |
| 6,104,406 A | 8/2000 | Berry et al. | |
| 6,201,544 B1 | 3/2001 | Ezaki | |
| 6,320,582 B1 | 11/2001 | Yamamoto et al. | |
| 6,500,069 B1 | 12/2002 | Ohba et al. | |
| 6,556,206 B1 | 4/2003 | Benson et al. | |
| 7,058,896 B2 | 6/2006 | Hughes | |
| 7,613,566 B1 | 11/2009 | Bolton | |
| 7,812,841 B2 | 10/2010 | Kamiwada et al. | |
| 7,933,395 B1 | 4/2011 | Bailly et al. | |
| 8,089,479 B2 | 1/2012 | Deb et al. | |
| 2002/0085046 A1 | 7/2002 | Furuta et al. | |
| 2002/0140698 A1 | 10/2002 | Robertson et al. | |
| 2004/0001110 A1 | 1/2004 | Khan | |
| 2006/0227134 A1 | 10/2006 | Khan et al. | |
| 2007/0273712 A1 | 11/2007 | O'Mullan et al. | |
| 2008/0062173 A1 | 3/2008 | Tashiro | |
| 2009/0204920 A1 | 8/2009 | Beverley et al. | |
| 2010/0045666 A1 * | 2/2010 | Kornmann et al. ........... 345/419 |
| 2010/0161208 A1 * | 6/2010 | Akita et al. .................. 701/201 |

FOREIGN PATENT DOCUMENTS

EP 0471484 A2 2/1992

OTHER PUBLICATIONS

Gruber, D., "The Mathematics of the 3D Rotation Matrix," Xtreme Game Developers Conference, Sep.-Oct. 1, 2000, available on the World Wide Web at http://www.fastgraph.com/makegames/3drotation/.
U.S. Appl. No. 12/423,434, Varandhan et al., filed Apr. 14, 2009.
Non-Final Rejection mailed Aug. 19, 2011, in U.S. Appl. No. 12/423,434, Varadhan et al., filed Apr. 14, 2009.

(Continued)

*Primary Examiner* — Mary Cheung
*Assistant Examiner* — Yuen Wong
(74) *Attorney, Agent, or Firm* — Sterne, Kessler, Goldstein & Fox PLLC

(57) ABSTRACT

Methods and systems for automatically adjusting a three-dimensional navigation system are provided. A method for automatically adjusting a display viewpoint for a three-dimensional navigation system may include receiving a velocity of a vehicle and a look-ahead distance between the vehicle and a look-ahead point, determining a range distance between the vehicle and the display viewpoint, determining the first position of the display viewpoint, displaying a three-dimensional view of a navigation route for the vehicle from the first position, receiving a change in the look-ahead distance, determining a new range distance, determining a second position of the display viewpoint, and automatically moving the position of the display viewpoint to the second position on a curvilinear swoop path located above and behind the vehicle. A corresponding system may include a navigation information collector, a range determiner and a display viewpoint adjuster.

22 Claims, 9 Drawing Sheets

(56) References Cited

OTHER PUBLICATIONS

Final Rejection mailed Feb. 29, 2012, in U.S. Appl. No. 12/423,434, Varadhan et al., filed Apr. 14, 2009.
Non-Final Rejection mailed Nov. 7, 2012, in U.S. Appl. No. 12/423,434, Varadhan et al., filed Apr. 14, 2009.
Buchholz, H. et al., "Smart and Physically-Based Navigation in 3D Geovirtual Environment," Proceedings Ninth International Conference on Information Visualisation, Jul. 6-8, 2005, pp. 629-635.
Burtnyk, N. et al., "Style-Cam: Interactive Stylized 3D navigation Using Integrated Spatial & Temporal Controls," ACM Symposium on User Interface Software and Technology, Oct. 27, 2002, pp. 101-110.
Google Earth, Jun. 29, 2005, http://web.archive.org/web/20050629095320/http://earth.google.com/ (one page).
Mackinlay, J.D., et al., "Rapid Controlled Movement Through a Virtual 3D Workspace," Computer Graphics, vol. 24, No. 4, Aug. 6, 1990, pp. 171-176.
International Search Report and the Written Opinion of the International Search Authority, or the Declaration, International Appln. No. PCT/US2009/002309 filed on Apr. 14, 2009, Report and Opinion mailed on Aug. 12, 2009, 20 pages.
International Preliminary Report on Patentability and the Written Opinion of the International Searching Authority, International application No. PCT/US2009/002309 filed on Apr. 14, 2009, Report issued on Oct. 19, 2010, 12 pages.
Ehnes, Jochen et al., "Projected Augmentation—Augmented Reality using Rotatable Video Projectors," *Proceedings of the Third IEEE and ACM International Symposium on Mixed and Augmented Reality* ("*ISMAR* 2004"), IEEE Computer Society, 10 pages 2004.
Final Rejection mailed Apr. 8, 2013 in U.S. Appl. No. 12/423,434, Varadhan et al., filed Apr. 14, 2009.

\* cited by examiner

AUTOMATIC ADJUSTMENT OF A CAMERA VIEW FOR A THREE-DIMENSIONAL NAVIGATION SYSTEM

BACKGROUND OF THE INVENTION

1. Technical Field

Embodiments of the present invention generally relate to vehicle navigation and route planning systems and more particularly to vehicle navigation systems capable of displaying three-dimensional maps and imagery.

2. Background Information

Electronic vehicle navigation systems and portable navigation devices (PND) provide route calculations, turn-by-turn instructions, voice prompts and imagery to help guide and direct a driver to a destination. Such systems typically utilize a global positioning system (GPS) to determine a vehicle's location in relation to a digital map displayed to a driver. These systems also typically include a processor, other computer hardware, and software designed to accept user input, calculate navigation routes and convey real-time navigation information to a driver.

In 2010, the global vehicle navigation system and PND market was estimated at nearly 40 million devices. Increasing popularity of GPS-enabled smartphones and numerous free and low-cost navigation applications should lead to continued growth in the overall number of devices used for vehicle navigation.

Existing vehicle navigation systems allow a driver to manually set a zoom level for displayed map imagery. However, the zoom level set at one point in time remains constant, even when driving conditions change. In addition, many commercial navigation systems include as many as ten or more zoom levels, which require manual scrolling on a slider or tapping to carry out adjustment. Thus, a driver must either manually adjust the zoom level while driving or accept an unadjusted and potentially confusing navigation display. Both scenarios can lead to driving mistakes, driver frustration and increased safety risks.

BRIEF SUMMARY OF THE INVENTION

Methods and systems for automatically adjusting a camera view for a three-dimensional navigation system are provided.

In an embodiment, a method for automatically adjusting a display viewpoint of a three-dimensional navigation system includes receiving a velocity of a vehicle and a look-ahead distance between the vehicle and a look-ahead point. A range distance between the vehicle and the display viewpoint is determined based on the received velocity and look-ahead distance. A first display viewpoint position is determined based on the range distance. A three-dimensional view of a navigation route is then displayed from the first display viewpoint position. Next, a change is received in the look-ahead distance. A new range distance is determined based on the velocity and the change in look-ahead distance. A second display viewpoint position is then determined based on the new range distance. Finally, the tilt of the display viewpoint is automatically adjusted and the position of the display viewpoint is automatically moved to the second position located on a curvilinear swoop path above and behind the vehicle.

In an additional embodiment, a system for automatically adjusting a display viewpoint of a three-dimensional navigation system for a vehicle includes a navigation information collector configured to receive a velocity of the vehicle and a look-ahead distance between the vehicle and a look-ahead point. The system also includes a range determiner configured to determine a range distance between the vehicle and the display viewpoint based on the velocity and the look-ahead distance. The system further includes a display viewpoint adjuster configured to determine a first position of the display viewpoint based on the range distance, to display a three-dimensional view of a navigation route for the vehicle from the first position, to receive a change in the look-ahead distance, to determine a new range distance based on the velocity and the change in the look-ahead distance, to determine a second position of the display viewpoint based on the updated range distance, and to automatically adjust a tilt of the display viewpoint and move the position of the display viewpoint to the second position located along a curvilinear swoop path above and behind the vehicle.

In another embodiment, a computer-readable storage device having control logic recorded thereon is executed by a processor, which causes the processor to automatically adjust a display viewpoint of a three-dimensional navigation system for a vehicle. The control logic includes a first computer-readable program code to cause the processor to receive a velocity of the vehicle and a look-ahead distance between the vehicle and a look-ahead point. The control logic also includes a second computer-readable program code to cause the processor to determine a range distance between the vehicle and the display viewpoint based on the velocity and the look-ahead distance. Further, the control logic includes a third computer-readable program code to cause the processor to determine the first position of the display viewpoint based on the range distance, to display a three-dimensional view of a navigation route for the vehicle from the first position, to receive a change in the look-ahead distance, to determine a new range distance based on the velocity and the change in the look-ahead distance, to determine a second position of the display viewpoint based on the updated range distance, and to automatically adjust the display viewpoint tilt and move the position of the display viewpoint to the second position located along a curvilinear swoop path above and behind the vehicle.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Embodiments are described herein with reference to the illustrative embodiments for particular applications, it should be understood that the invention is not limited to the described embodiments. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Vehicle navigation systems provide audio and visual route navigation instructions with corresponding map imagery to guide a driver to a destination. Such systems also may be used to find alternative routes and to locate points of interest. However, existing vehicle navigation systems do not provide continuous, automated adjustment of a vehicle navigation display according to real-time driving conditions. As a result, a driver must either manually adjust zoom and display settings or accept a stale display view until an update occurs.

Embodiments described herein relate to automatic adjustment of a camera view for a three-dimensional navigation system. Such embodiments provide the perspective of a personalized, virtual flying camera positioned at various points along a curvilinear swoop path located above and behind a vehicle, or a representation of the vehicle. The position and tilt of the virtual camera viewpoint are automatically adjusted based on changes in driving conditions, without any manual intervention. Thus, a driver is automatically presented with navigation imagery tailored to constantly changing driving conditions, thereby reducing distraction and improving the driving experience.

Additional embodiments may also extend and apply to any moving object with variable speed. Such objects may include, but are not limited to, boats, ships, trains, buses, motorcycles, taxis, and driverless vehicles. These and other types of moving objects with variable speed are generally referred to herein as a vehicle. In addition, embodiments are not limited to vehicle navigation and may be applied towards visualization relating to any moving object, including the use of informational displays.

Figure 1:
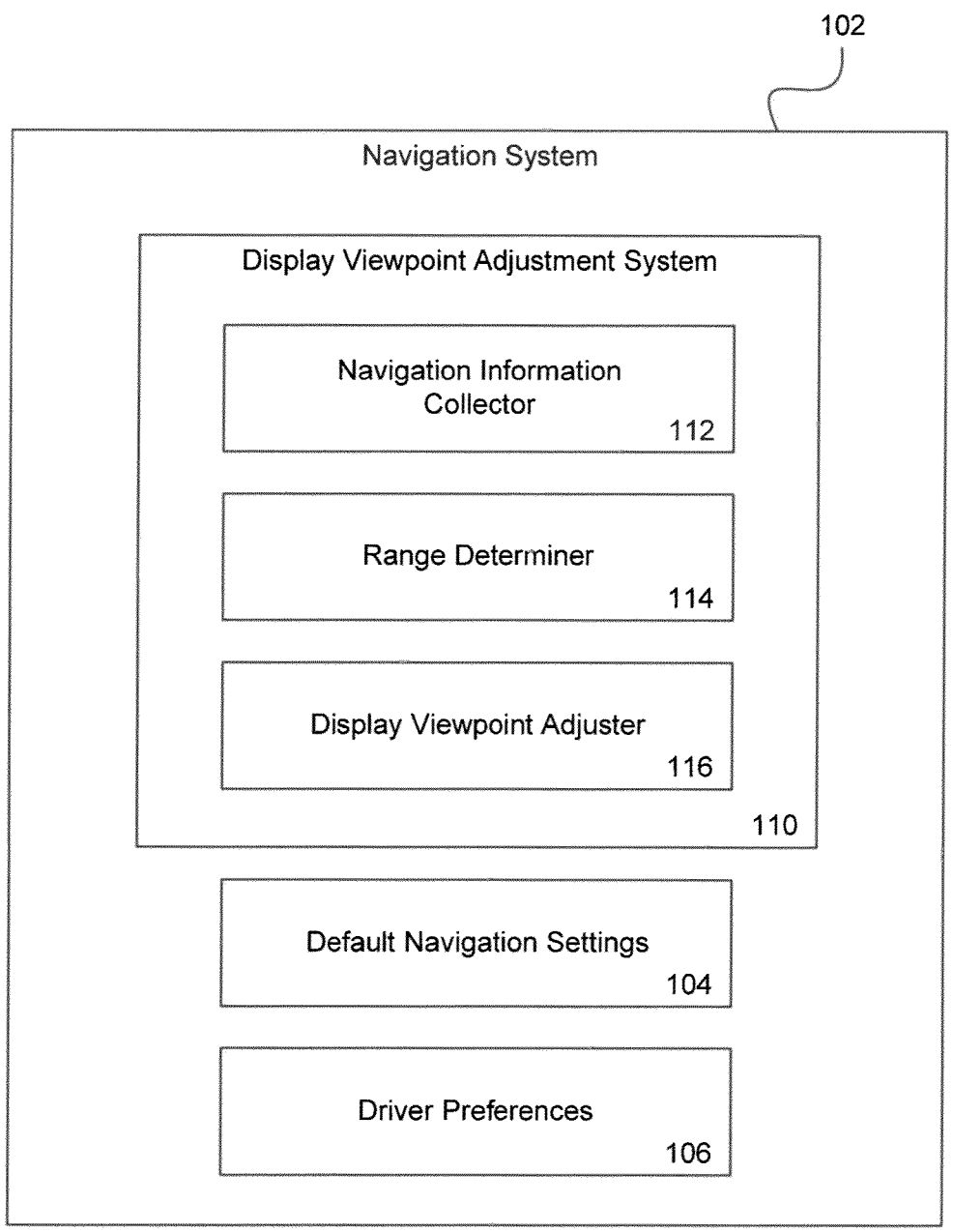
FIG. 1 is a block diagram of a system for automatically adjusting a display viewpoint of a three-dimensional navigation system according to an embodiment.

FIG. 1 is a block diagram of exemplary system 100 for automatically adjusting a display viewpoint of a three-dimensional navigation system, according to an embodiment. Three-dimensional views provided from the display viewpoint may be rendered for display as two-dimensional scenes. Such rendering may include the use of stereoscopic, photorealistic or other imaging techniques to provide the perception of three-dimensional depth in a two-dimensional display.

System 100, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware may include, but is not limited to, a processor, memory and user interface display.

The computing device can be configured to access content hosted on web servers over a network. The network can be any network or combination of networks that can carry data communications. Such a network can include, but is not limited to, a wired (e.g., Ethernet) or a wireless (e.g., Wi-Fi and 4 G) network. In addition, the network can include, but is not limited to, a local area network, medium area network, and/or wide area network such as the Internet. The network can support protocols and technology including, but not limited to, Internet or World Wide Web protocols and/or services. Intermediate network routers, gateways, or servers may be provided between servers and clients depending upon a particular application or environment.

System 100 may include a navigation system 102 in communication with a display viewpoint adjustment system 110, either directly or using an application programming interface (API). Navigation system 102 may access default navigation settings 104 and driver preferences 106, which may be available locally or network accessible. In addition, display viewpoint adjustment system 110 may include a navigation information collector 112, a range determiner 114, and a display viewpoint adjuster 116.

In one embodiment, system 100 can be a computing device integrated into a vehicle, such as an on-board navigation system installed directly into the dashboard of the vehicle during the manufacturing process. According to another embodiment, system 100 can also be a computing device that is separate from the vehicle, but travels along with the vehicle. For example, system 100 can be implemented using a computing device such as a GPS-enabled smartphone or a portable-navigation device. An additional embodiment of system 100 may include a remote computing device configured to receive information about the movement of the vehicle from a GPS tracking device.

Figure 2:
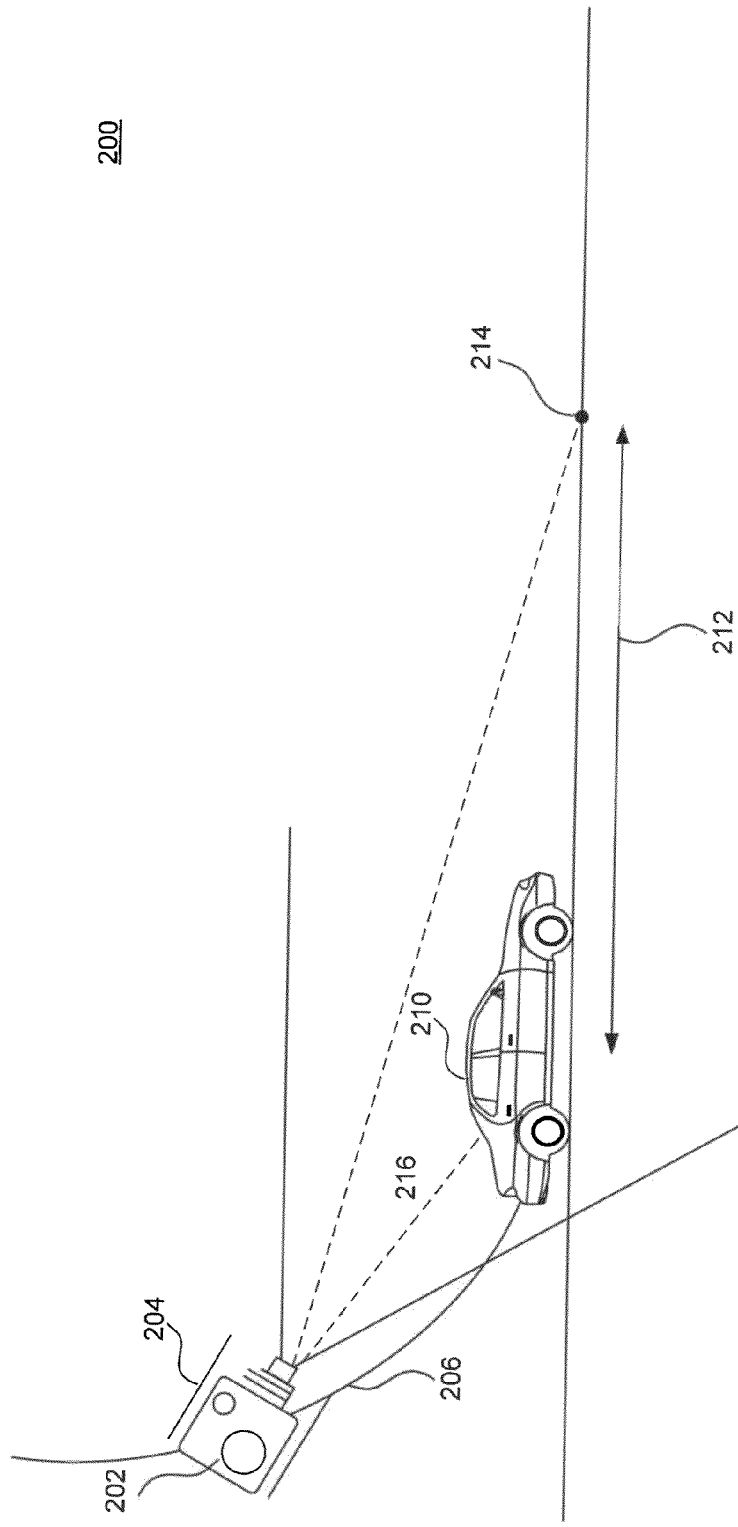
FIG. 2 is an illustration of a virtual camera display viewpoint for a three-dimensional navigation system according to an embodiment.

FIG. 2 is an illustration of a virtual camera display viewpoint for a three-dimensional navigation system according to an embodiment. Virtual camera 202 having tilt 204 is positioned at a display viewpoint position located on a curvilinear swoop path 206 above and behind vehicle representation 210. Look-ahead distance 212 is the distance that a driver wishes to see ahead when operating vehicle 210. Look-ahead distance 212 may be a specific distance or a distance calculated based on the number of seconds a driver wishes to see ahead when traveling at a certain velocity. Further, look-ahead distance 212 may be based on one or more of default navigation system settings 104 and driver preferences 106, and may be further adjusted based on any number of driving conditions.

According to an embodiment, vehicle 210 travels down a roadway at varying speeds along a navigation route displayed by navigation system 102. Vehicle 210 has a velocity at any given moment in time with changes in velocity occurring as vehicle 210 accelerates and decelerates.

In an embodiment, navigation information collector 112 receives the velocity of vehicle 210 and look-ahead distance 212. Range determiner 114 then determines a range distance 216, which is the distance between vehicle 210 and the virtual camera display viewpoint position, based on the received velocity and look-ahead distance 212. Display viewpoint adjuster 116 then determines a first display viewpoint position along a curvilinear swoop path 206 and also a display viewpoint tilt 204 based on the determined range distance 216. Virtual camera 202 is then automatically moved to the determined first position, tilt 204 is automatically adjusted, and a three-dimensional navigation view from the first position is displayed by navigation system 102.

Navigation information collector 112 then receives an updated velocity as vehicle 210 accelerates or decelerates. Navigation information collector 112 may also receive an updated look-ahead distance 212 in addition to a change in speed. Range determiner 114 determines a new range distance 216 based on the updated velocity and the updated look-ahead distance. Display viewpoint adjuster 116 determines a second position of the display viewpoint based on the updated range distance. Display viewpoint adjuster then automatically moves the display viewpoint to a second position along curvilinear swoop path 206 located above and behind the vehicle and automatically adjusts the tilt 204 of the display viewpoint. As the velocity of vehicle 210 and look-ahead distance 212 continue to change, this process will be repeated to automatically determine and adjust the display viewpoint position and tilt based on changes in speed and driving conditions.

According to a number of embodiments, range distance 216 may be calculated as a function having one or more input variables including one or more of a velocity of vehicle 210, a number of seconds a driver wishes to look ahead, a distance a driver wishes to look ahead, a position where the vehicle is to appear on a three-dimensional navigation display, a position where the look-ahead point is to appear on a three-dimensional navigation display, an equation of a curvilinear swoop path, and one or more driver preferences relating to camera orientation and tilt. Such embodiments may calculate range distance 216 as a mathematical equation, which may incorporate one or more additional variables. Further, range distance 216 may be updated or recalculated periodically, based on an external prompt or event, and based on changes to one or more input variables.

Other embodiments may determine range distance 216 based on incremental refinement of the display viewpoint along a curvilinear swoop path. For example, the display viewpoint may be adjusted incrementally on a curvilinear swoop path 206 based on knowing the equation of curvilinear swoop path 206, a position where vehicle 210 is to be displayed on a three-dimensional navigation display, and a position where look-ahead point 214 is to be displayed on a three-dimensional navigation display. User preferences relating to navigation display also may be used to influence an incremental refinement system.

For example, according to additional embodiments, the position of the display viewpoint can be incrementally adjusted higher on curvilinear swoop path 206 as a vehicle accelerates and look-ahead distance increases. Alternatively, the position of the display viewpoint can be adjusted lower on curvilinear swoop path 206 as a vehicle decelerates and look-ahead distance decreases. Additional embodiments may include use of systems and methods presented in U.S. patent application Ser. No. 12/423,434, entitled SWOOP NAVIGATION (US 2009/0259976), which is incorporated herein by reference in its entirety.

Figure 3:
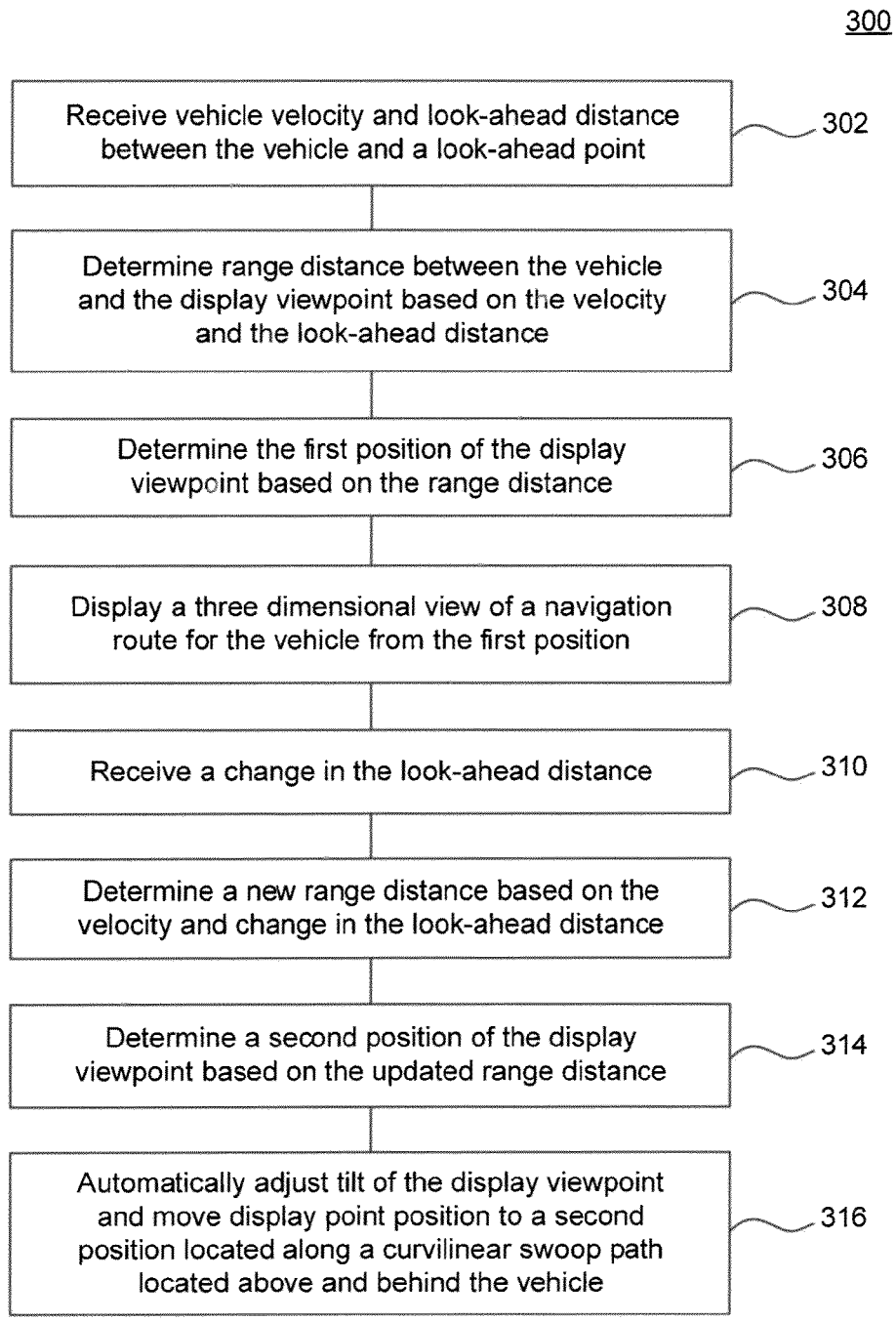
FIG. 3 is a flow diagram of a method for automatically adjusting a display viewpoint of a three-dimensional navigation system according to an embodiment.

FIG. 3 is a flow diagram of a method for automatically adjusting a display viewpoint of a three-dimensional navigation system according to an embodiment. Method 300 begins at step 302 when vehicle 210 is in motion. The velocity of vehicle 210 and look-ahead distance 212 to look-ahead point 214 are received. Velocity may be received directly from vehicle 210, navigation system 102 or another device capable of capturing or determining velocity. In addition, a future velocity may be anticipated based on a rate of acceleration or deceleration. Look-ahead distance 212 may also be supplied using default navigation settings 104 or driver preferences 102, which may be stored locally or remotely, or provided in real-time using voice commands or computer system input. Step 302 may be performed by navigation information collector 112.

At step 304, a range distance 216 between vehicle 210 and the display viewpoint is determined based on the received velocity and look-ahead distance 214. Step 304 may be performed by range determiner 114.

At step 306, a first position of the display viewpoint is determined based on the range distance 216. Step 306 may be performed by display viewpoint adjuster 116.

At step 308, a three-dimensional view of a navigation route for the vehicle is displayed to the driver, from the determined first position. Step 308 may be performed by display viewpoint adjuster 116.

At step 310, a change in the velocity of vehicle 210 and the look-ahead distance is received. Step 310 may be performed by navigation information collector 112.

At step 312, a new range distance is determined based on the velocity and change in look-ahead distance. Step 312 may be performed by range determiner 114.

At step 314, a second position of the display viewpoint is determined based on the new range distance. Step 314 may be performed by display viewpoint adjuster 116.

At step 316, the position of the display viewpoint is automatically adjusted to the second position along a curvilinear swoop path located above and behind the vehicle and the tilt of the display viewpoint is also automatically adjusted. Step 316 may be performed by display viewpoint adjuster 116.

Figure 4:
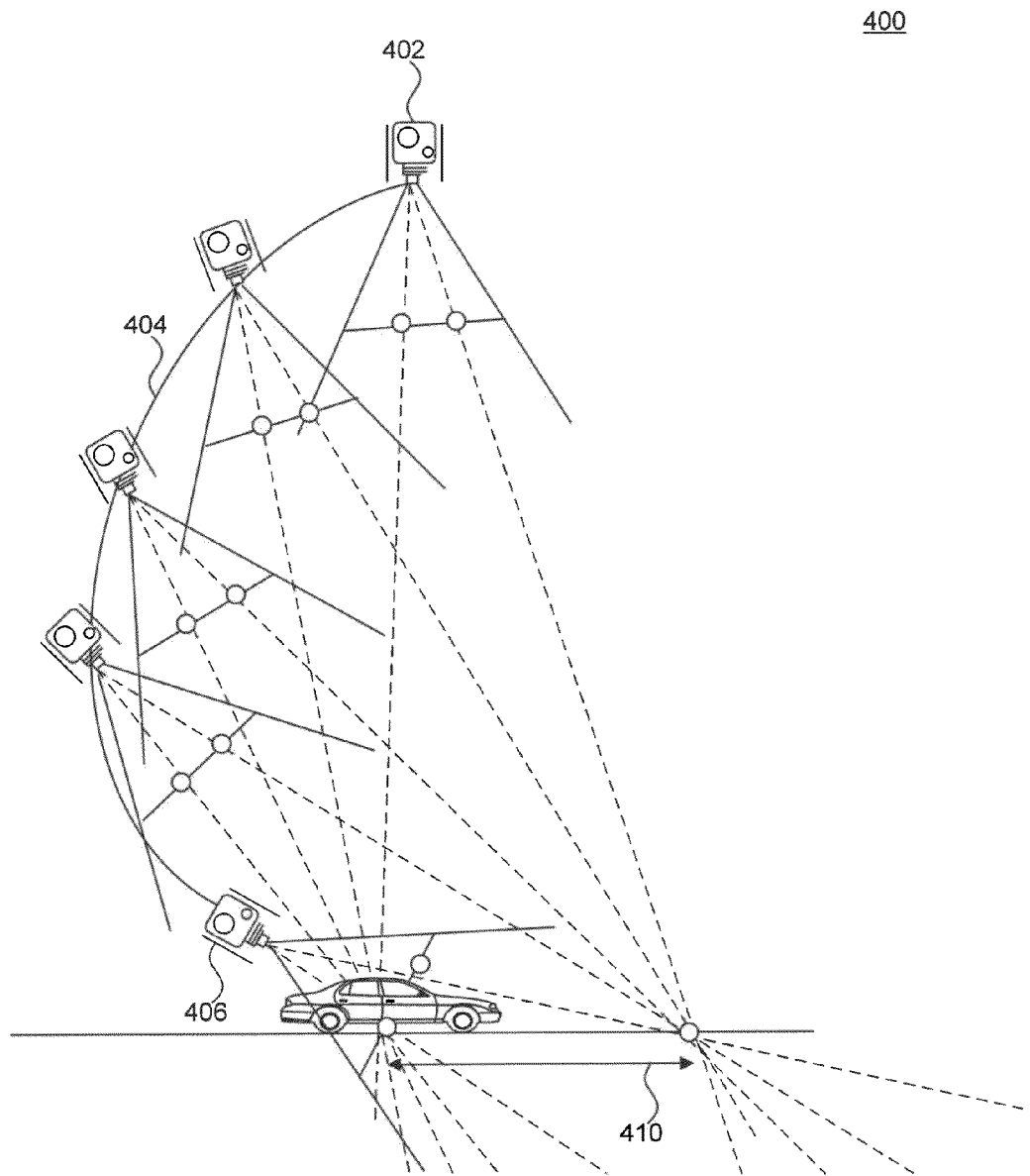
FIG. 4 is an illustration of the general movement of a virtual camera along a curvilinear swoop path according to an embodiment.

FIG. 4 is an illustration of the general movement of a virtual camera along a curvilinear swoop path, according to an embodiment.

The size and curvature of curvilinear swoop path 404 are determined dynamically based on vehicle velocity. In addition, the display viewpoint position and tilt of the display viewpoint are adjusted based on changes in velocity. In an embodiment, the characteristics of curvilinear swoop path 404 and the display viewpoint remain unchanged at a constant velocity.

Display viewpoint 402 illustrates a display viewpoint position for a vehicle traveling at a high velocity, according to an embodiment. Display viewpoint 406 illustrates a display viewpoint position for a vehicle moving at a low speed, according to another embodiment.

Generally, as vehicle velocity increases, the display viewpoint position moves higher along curvilinear swoop path 404, increasing both the range distance and the visible area within range of the display viewpoint. As velocity decreases, the display viewpoint position moves closer to the to the vehicle, providing a more focused view of the navigation route and its surroundings.

The tilt of the display viewpoint is also adjusted based on velocity. For example, as vehicle 210 accelerates, the curvature of curvilinear swoop path 404 increases and the display viewpoint position moves away from vehicle 210 as the display viewpoint position moves higher along the curve. As a result, the display viewpoint tilt must be adjusted downward based on one or more of display viewpoint position, velocity, look-ahead point, range distance, default navigation settings, and driver preferences. On the other hand, as vehicle 210 slows down, virtual display viewpoint approaches the ground and the tilt must be adjusted horizontally to maintain focus on the look-ahead point in front of the vehicle, which can also be fine-tuned using the same parameters.

Display viewpoint settings may be based on pre-configured system settings, such as default navigation system settings. Display viewpoint settings may also be parameterized based on user preference. For example, user preferences may include look-ahead distance, look-ahead time, range distance, tilt angle, and other settings when traveling at a particular speed.

In addition, the position and tilt of the display viewpoint may be further influenced and adjusted based on changes in attributes related to a driver, a vehicle, a navigation route, weather, and visibility. Driver-related attributes may include a driving habit of a driver, driving performance of a driver, driver familiarity with route, vital signs, vision, and age. Vehicle attributes may include vehicle size, weight, and performance capabilities. Navigation route factors may include terrain, route complexity, route characteristics, traffic pattern changes, actual or anticipated traffic volume, events occurring along the navigation route, approaching objects, obstructions to the display view, trip duration and proximity to a final destination point. Weather conditions, visibility, time of day, and available daylight also may be used as influencing factors when determining the display viewpoint position and tilt.

Figure 5:
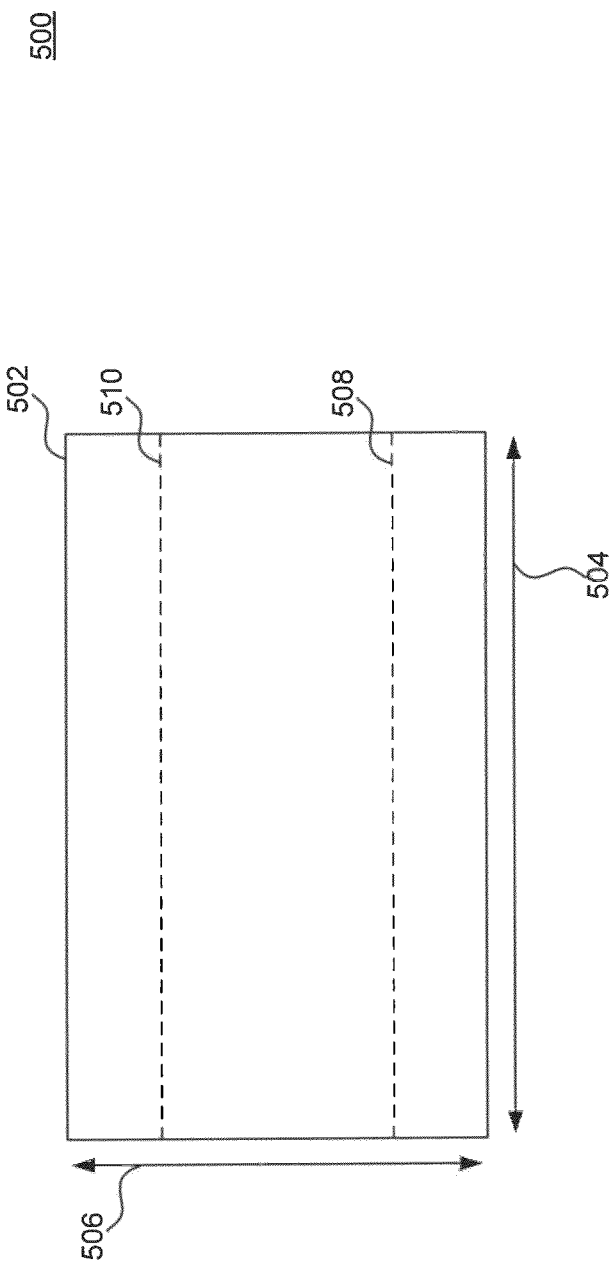
FIG. 5 is an illustration of a navigation system screen layout according to an embodiment.

FIG. 5 is an illustration of a navigation system display according to an embodiment. Navigation system display 500 includes navigation system screen 502 with a horizontal field of view 504 and a vertical field of view 506, both corresponding to the look-ahead view of a navigation route. In an embodiment, near distance 508 is where the vehicle will be positioned on the navigation screen. Near distance 508 is approximately 25% from the bottom of navigation system screen 502. Far distance 510 is where the look-ahead point will be positioned on the navigation screen. Far distance 510, is located approximately 25% from the top of navigation system screen 502. Near distance 508 and far distance 510 also may be parameterized and positioned in other locations of the navigation display based on user preference.

Existing navigation systems typically center a vehicle on a navigation system display. However, in an embodiment, the spacing between the near distance and the far distance remains constant on the navigation system display. This is accomplished by further adjusting a determined display viewpoint position and tilt to accommodate navigation system or user preferred near distance and far distance positions on the navigation screen.

Figure 6:
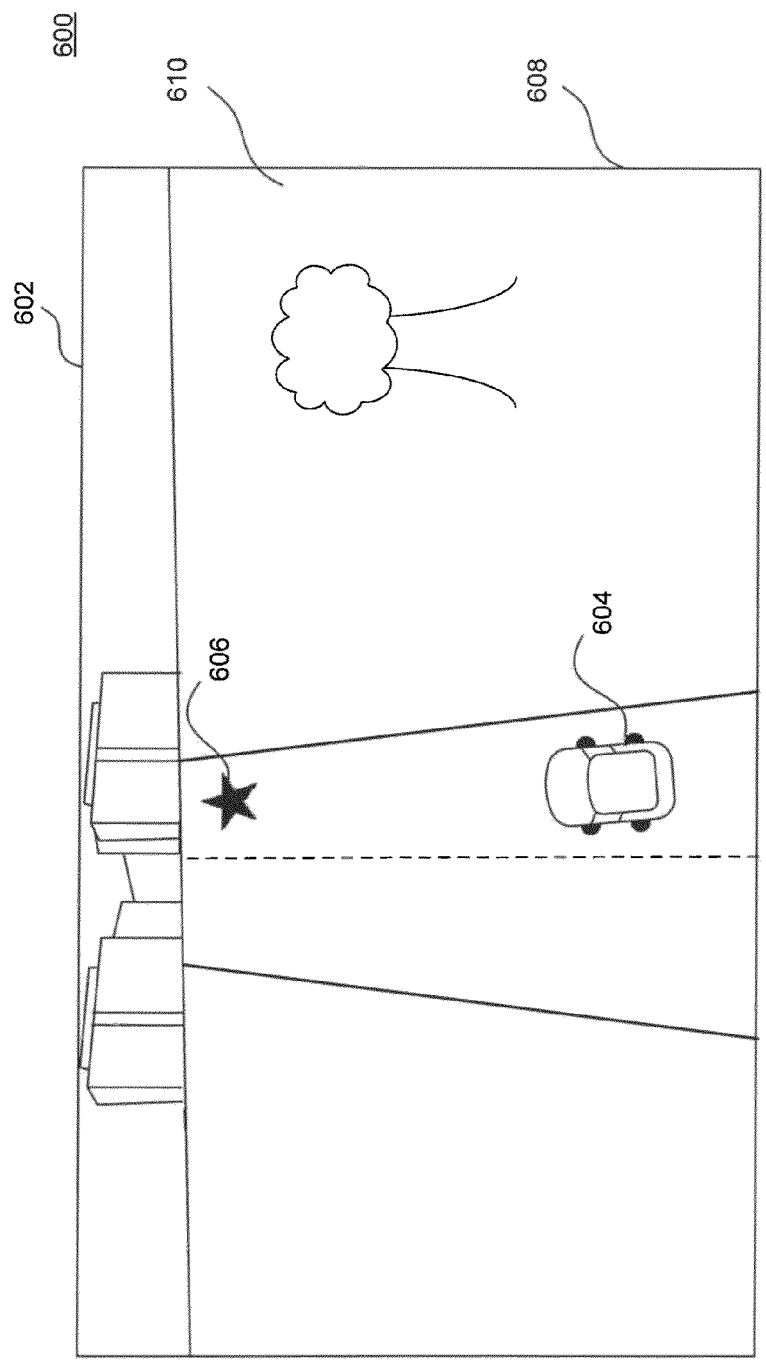
FIG. 6 is an illustration of a navigation display view according to an embodiment.

FIG. 6 is an illustration of a navigation display view according to an embodiment. Display view 600 generalizes a virtual camera navigation display view for a vehicle traveling at a relatively low speed. According to an embodiment, navigation system screen 602 displays vehicle 604 and look-ahead point 606. Near distance 608 is consistently displayed approximately 25% from the bottom of navigation system screen 602. Far distance 610 is consistently displayed approximately 25% from the top of navigation system screen 602.

Figure 7:
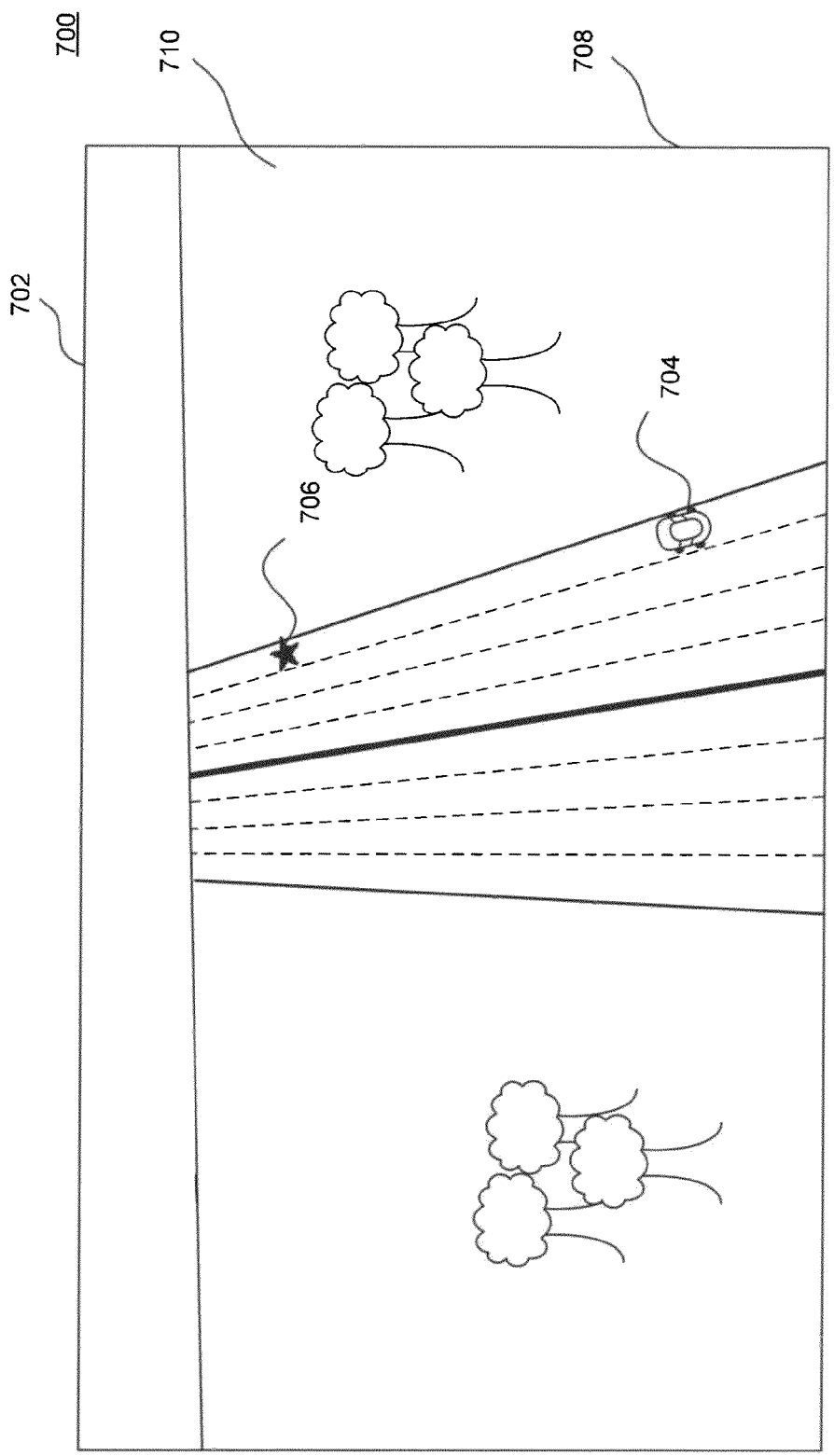
FIG. 7 is an additional illustration of a navigation display view according to an embodiment.

FIG. 7 is an additional illustration of a navigation display view according to an embodiment. Display view 700 generalizes a virtual camera navigation display view for a vehicle traveling at a higher speed than the embodiment illustrated in FIG. 6. Navigation system screen 702 displays vehicle 704 and look-ahead point 706. Near distance 708 is consistently displayed approximately 25% from the bottom of navigation system screen 702. Far distance 710 is consistently displayed approximately 25% from the top of navigation system screen 702.

Figure 8:
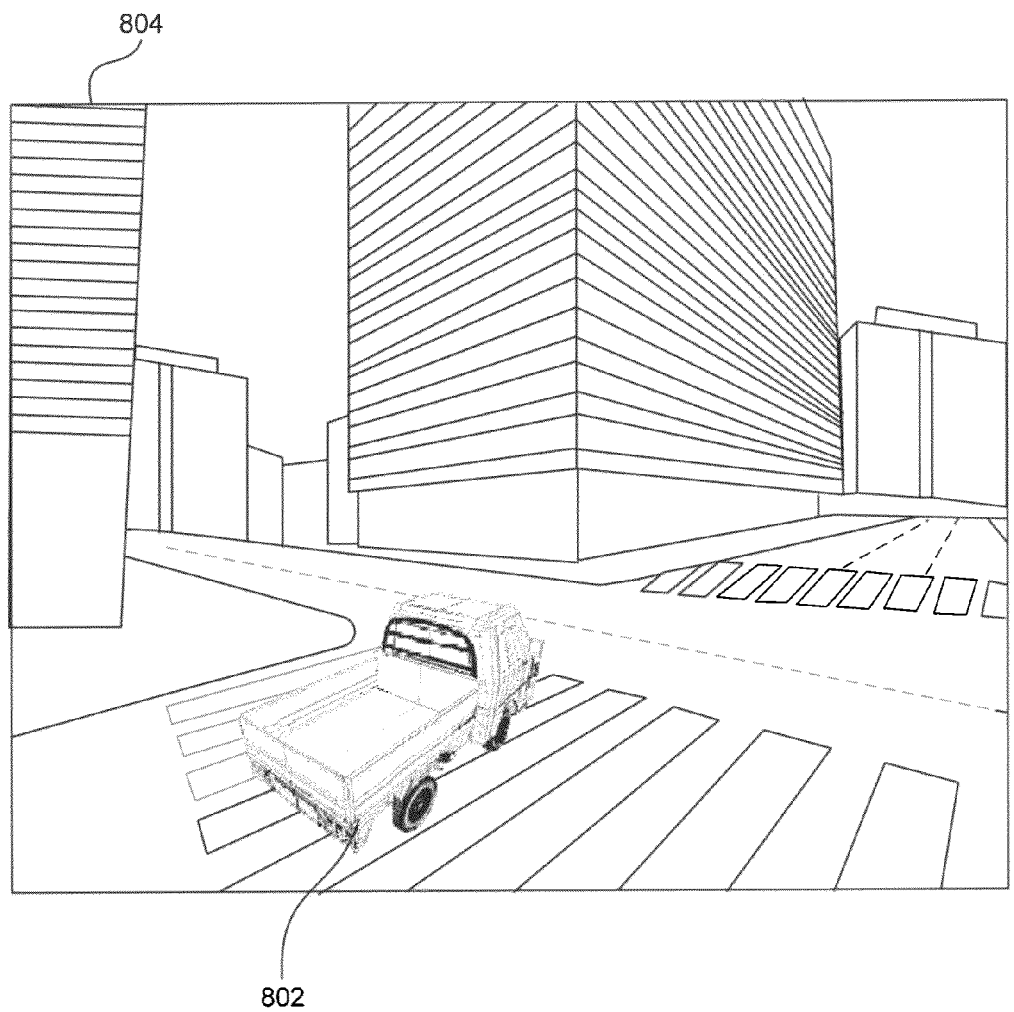
FIG. 8 is an illustration of a temporary alternative viewpoint according to an embodiment.

FIG. 8 is an illustration of a temporary alternative viewpoint according to an embodiment. Temporary alternative display view 800 illustrates a non-traditional navigation display view that may be provided when any physical object such as a building, tree, or other obstruction threatens to interfere or actually interferes with the three-dimensional navigation view of a display viewpoint located along a curvilinear swoop path above and behind a vehicle. A temporary alternative display viewpoint is not fixed and may be located anywhere alongside, above, or in front of a vehicle for the purpose of providing a driver with an unobstructed or improved navigation view. In addition, a temporary display viewpoint may also follow its own curvilinear swoop path located above any position surrounding the representation of a vehicle.

Vehicle 802 is seen from a temporary alternative viewpoint located near the side of the vehicle representation to prevent tall building 804 from blocking the navigation display view during a turn. Alternatively, a temporary alternative viewpoint may be positioned, for example, in front of and facing a representation of vehicle 802 around the corner from building 804. Once the obstruction has been passed, the display viewpoint is readjusted and returned to a position located along a traditional curvilinear swoop path above and behind the vehicle. A temporary display viewpoint also may be used in response to other conditions such as sudden movement of a vehicle, reverse direction of a vehicle, an approaching object, an anticipated driving maneuver, a traffic pattern, and also may be further customized based on user preference.

Temporary display viewpoint user preferences may include one or more of a general or specific display viewpoint position or orientation, an amount of space surrounding a vehicle, and a degree of tilt for specific conditions. For example, temporary alternative viewpoint preferences may be defined for one or more driving scenarios such as driving environment, driving maneuver, speed, and navigation viewpoint obstacle type.

Example Computer Embodiment

Figure 9:
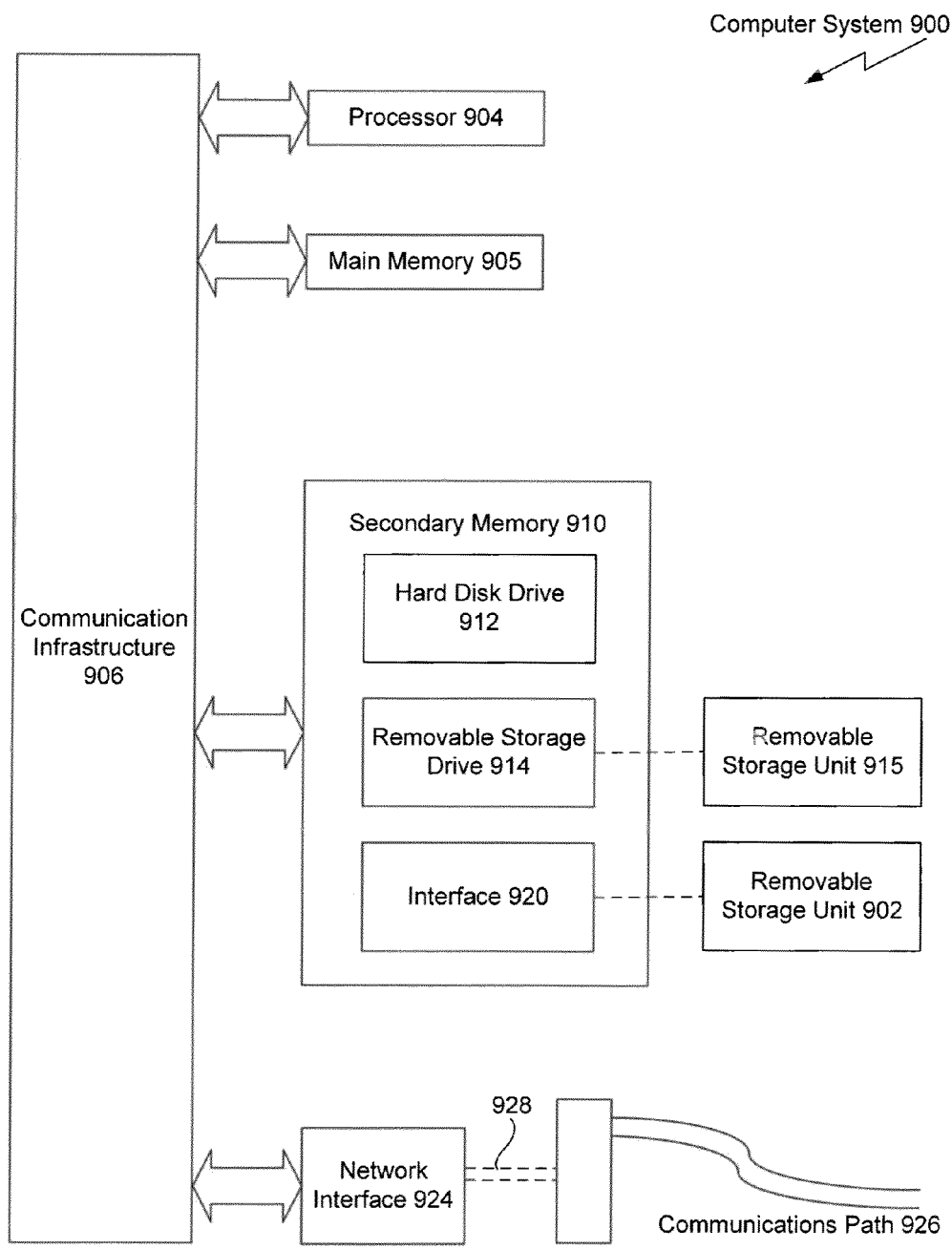
FIG. 9 is a diagram of a computer system that may be used in an embodiment of the present invention.

In an embodiment of the present invention, the system and components of embodiments described herein are implemented using well known computers, such as example computer system 900 shown in FIG. 9. For example, navigation system 102 and display viewpoint adjustment system 110 or any of its respective modules may be implemented using computer system 900.

Computer system 900 can be any commercially available and well-known computer capable of performing the functions described herein. Such computer systems may include embedded computer systems, mobile computers, on-board computer systems and vehicle mounted computer systems.

Computer system 900 includes one or more processors (also called central processing units, or CPUs), such as a processor 904. Processor 904 is connected to a communication infrastructure 906. Such processors may include ARM or SuperH-based processors.

Computer system 900 also includes a main or primary memory 908, such as random access memory (RAM). Main memory 908 has stored control logic (computer software), and data.

Computer system 900 also includes one or more secondary storage devices 910. Secondary storage device 910 includes, for example, a hard disk drive 912 and/or a removable storage device or drive 914, as well as other types of storage devices, such as memory cards, memory sticks and flash-based drives. Removable storage drive 914 represents a floppy disk drive, a magnetic tape drive, a compact disk drive, an optical storage device, tape backup, etc.

Removable storage drive 914 interacts with a removable storage unit 918. Removable storage unit 918 includes a computer useable or readable storage device having stored thereon computer software (control logic) and/or data. Removable storage unit 918 represents a floppy disk, magnetic tape, compact disk, DVD, optical storage disk, memory card, or any other computer data storage device. Removable storage drive 914 reads from and/or writes to removable storage unit 918 in a well-known manner.

Computer system 900 also includes input/output/display devices 930, such as monitors, keyboards, pointing devices, etc., which communicate with communication infrastructure 906 through a display interface 902.

Computer system 900 further includes a communication or network interface 924. Communications interface 924 enables computer system 900 to communicate with remote devices. For example, communications interface 924 allows computer system 900 to communicate over communications path 926 (representing a form of a computer useable or readable medium), such as LANs, WANs, the Internet, etc. Communications interface 924 may interface with remote sites or networks via wired or wireless connections.

Control logic may be transmitted to and from computer system 900 via communication path 926. More particularly, computer system 900 may receive and transmit carrier waves (electromagnetic signals) modulated with control logic via communication path 926.

Any apparatus or article of manufacture comprising a computer useable or readable medium having control logic (software) stored thereon is referred to herein as a computer program product or program storage device. This includes, but is not limited to, computer system 900, main memory 908, secondary storage device 910, and removable storage unit 918. Such computer program products, having control logic stored thereon that, when executed by one or more data processing devices, causes such data processing devices to operate as described herein, represent embodiments of the invention.

Embodiments of the invention can work with software, hardware, and/or operating system implementations other than those described herein. Any software, hardware, and operating system implementations suitable for performing the functions described herein can be used. Embodiments of the invention are applicable to both a client and to a server or a combination of both.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

In addition, the foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for automatically adjusting a virtual camera display viewpoint of a three-dimensional navigation system for a vehicle comprising:
    receiving a velocity of the vehicle and a look-ahead distance between the vehicle and a look-ahead point;
    determining a range distance between the vehicle and the virtual camera display viewpoint based on the velocity and the look-ahead distance;
    determining, by a processor-based device, a first position of the virtual camera display viewpoint based on the range distance;
    displaying a three-dimensional view of a navigation route for the vehicle from the first position;
    receiving a change in the look-ahead distance;
    determining a new range distance based on the velocity and the change in the look-ahead distance;
    determining a second position of the virtual camera display viewpoint based on the updated range distance; and
    automatically adjusting a tilt of the virtual camera display viewpoint and moving the position of the virtual camera display viewpoint to the second position, wherein the virtual camera display viewpoint moves to the second position along a curvilinear swoop path located above and behind a representation of the vehicle.

2. The method of claim 1, wherein the determination of the new range distance is based on a second received velocity and the change in the look-ahead distance.

3. The method of claim 1, wherein the determination of the new range distance is based on an anticipated velocity and the change in the look-ahead distance.

4. The method of claim 1, wherein the determination of the position of the virtual camera display viewpoint and the tilt of the virtual camera display viewpoint are made such that the location of the vehicle and the location of the look-ahead point on a three-dimensional navigation system display remain constant.

5. The method of claim 1, wherein the determination of the second position of the virtual camera display viewpoint is made to provide an unobstructed display viewpoint to the driver.

6. The method of claim 1, further comprising:
    determining a temporary alternative display viewpoint position and tilt based on a condition; and automatically readjusting the three-dimensional view of the navigation route for the vehicle to reflect the temporary alternative display viewpoint position and tilt.

7. The method of claim 6, wherein the temporary alternative display viewpoint position and tilt are based on sudden movement of the vehicle.

8. The method of claim 6, wherein the temporary alternative display viewpoint position and tilt are based on a reverse direction of the vehicle.

9. The method of claim 6, wherein use of a temporary alternative display viewpoint is based on a condition existing further along the navigation route in front of the vehicle.

10. The method old claim 6, wherein the determination of the temporary alternative display viewpoint position and tilt is based on avoidance of an obstruction to the three-dimensional navigation viewpoint.

11. The method of claim 6, further comprising:
automatically returning the three-dimensional view of the navigation route to a previously displayed viewpoint and tilt.

12. A system for automatically adjusting a virtual camera display viewpoint of a three-dimensional navigation system for a vehicle comprising:
a navigation information collector configured to receive a velocity of the vehicle and a look-ahead distance between the vehicle and a look-ahead point;
a range determiner implemented by a processor-based device and configured to determine a range distance between the vehicle and the virtual camera display viewpoint based on the velocity and the look-ahead distance; and
a virtual camera display viewpoint adjuster implemented by a processor-based device and configured to:
determine a first position of the virtual camera display viewpoint based on the range distance,
display a three-dimensional view of a navigation route for the vehicle from the first position,
receive a change in the look-ahead distance,
determine a new range distance based on the velocity and the change in the look-ahead distance,
determine a second position of the virtual camera display viewpoint based on the updated range distance, and
automatically adjust a tilt of the virtual camera display viewpoint and move the position of the virtual camera display viewpoint to the second position, wherein the virtual camera display viewpoint moves to the second position along a curvilineal swoop path located above and behind a representation of the vehicle.

13. The system of claim 12, wherein the determination of the new range distance is based on a second received velocity and the change in the look-ahead distance.

14. The system of claim 12, wherein the determination of the new range distance is based on an anticipated velocity and the change in the look-ahead distance.

15. The system of claim 12, wherein the determination of the position of the virtual camera display viewpoint and the tilt of the virtual camera display viewpoint are made in part based on the vehicle's proximity to a final destination point.

16. The system of claim 12, wherein the determination of the second position of the virtual camera display viewpoint is made to provide an unobstructed display viewpoint to the driver.

17. The system of claim 12, further comprising:
determining a temporary alternative display viewpoint position and tilt based on a condition; and
automatically readjusting the three-dimensional view of the navigation route for the vehicle to reflect the temporary alternative display viewpoint position and tilt.

18. The system of claim 17, wherein the temporary alternative display viewpoint position and tilt are based on sudden movement of the vehicle.

19. The system of claim 17, wherein the temporary alternative display viewpoint position and tilt arc based on a reverse direction of the vehicle.

20. The system of claim 17, wherein the determination of the temporary alternative display viewpoint position and tilt is based on avoidance of an obstruction to the three-dimensional navigation viewpoint.

21. The system of claim 17, further comprising:
automatically returning the three-dimensional view of the navigation route to a previously displayed viewpoint and tilt.

22. A computer-readable storage device having control logic recorded thereon that when executed by a processor, causes the processor to automatically adjust a virtual camera display viewpoint of a three-dimensional navigation system for a vehicle, the control logic comprising:
a first computer-readable program code to cause the processor to receive a velocity of the vehicle and a look-ahead distance between the vehicle and a look-ahead point;
a second computer-readable program code to cause the processor to determine a range distance between the vehicle and the virtual camera display viewpoint based on the velocity and the look-ahead distance; and
a third computer-readable program code to cause the processor to:
determine a first position of the virtual camera display viewpoint based on the range distance,
display a three-dimensional view of a navigation route for the vehicle from the first position,
receive a change in the look-ahead distance,
determine a new range distance based on the velocity and the change in the look-ahead distance,
determine a second position of the virtual camera display viewpoint based on the updated range distance, and
automatically adjust a tilt of the virtual camera display viewpoint and move the position of the virtual camera display viewpoint to the second position, wherein the virtual camera display viewpoint moves to the second position along a curvilinear swoop path located above and behind a representation of the vehicle.

\* \* \* \* \*

UNITED STATES PATENT AND TRADEMARK OFFICE
CERTIFICATE OF CORRECTION

PATENT NO. : 8,626,434 B1  
APPLICATION NO. : 13/410217  
DATED : January 7, 2014  
INVENTOR(S) : Kornmann et al.

Page 1 of 1

It is certified that error appears in the above-identified patent and that said Letters Patent is hereby corrected as shown below:

In the Claims:

Column 11, line 13, after "method", please delete "old" and insert --of--

Column 11, line 47, after "along a", please delete "curvilineal" and insert --curvilinear--

Column 12, line 16, after "and tilt", please delete "arc" and insert --are--

Signed and Sealed this  
Twenty-fifth Day of November, 2014

Michelle K. Lee  
*Deputy Director of the United States Patent and Trademark Office*